D McR. LIVINGSTON & C. W. FAIRBANK.
RADIATOR SUPPORT FOR AUTOMOBILES.
APPLICATION FILED MAY 14, 1909.
988,119.
Patented Mar. 28, 1911.
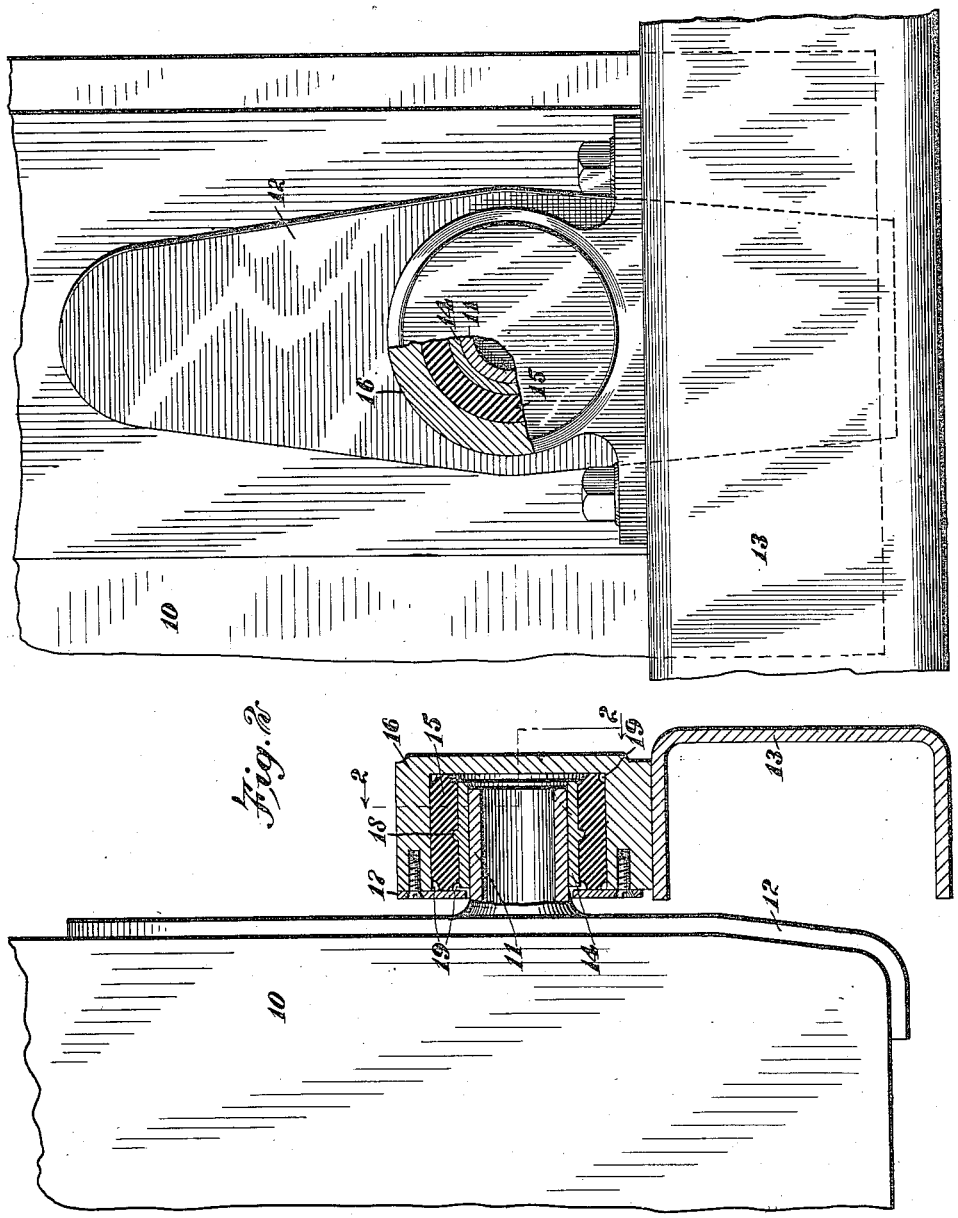
WITNESSES
INVENTORS
D McRa Livingston
Clair Wesley Fairbank
BY
ATTORNEYS

UNITED STATES PATENT OFFICE.

D McRA LIVINGSTON AND CLAIR W. FAIRBANK, OF NEW YORK, N. Y.

RADIATOR-SUPPORT FOR AUTOMOBILES.

988,119.  Specification of Letters Patent.  Patented Mar. 28, 1911.

Application filed May 14, 1909. Serial No. 495,986.

*To all whom it may concern:*

Be it known that we, D McRA LIVINGSTON and CLAIR WESLEY FAIRBANK, both citizens of the United States, and residents of the city of New York, borough of Manhattan, in the county and State of New York, have invented a new and Improved Radiator-Support for Automobiles, of which the following is a full, clear, and exact description.

This invention relates to certain improvements in means for supporting the radiator of an automobile and so connecting it to the automobile frame as to permit of a limited movement of one in respect to the other, and thus avoid all unnecessary strain upon the radiator due to the bending, twisting or distorting of the automobile frame.

The object of the invention is to so construct the supporting means that the radiator may have a slight rocking or swinging movement about a horizontal axis transversely of the frame, whereby this axis may be varied in respect to the frame as the latter is distorted, as, for instance, when the automobile is traveling over very rough roads, and whereby a careful adjustment of the parts is unnecessary to the successful operation of the device.

In our improved support we employ two trunnions at opposite sides of the radiator, and these trunnions are supported so that they may be twisted or bent to a limited extent within their bearing boxes. Each trunnion is longitudinally movable and rotatable within a bushing or sleeve, and this bushing or sleeve is resiliently supported, preferably by a block of rubber or similar material.

Reference is to be had to the accompanying drawings, forming a part of this specification, in which similar characters of reference indicate corresponding parts in both the figures, and in which—

Figure 1 is a sectional view through a support constructed in accordance with our invention, said section being taken transversely of the automobile frame; and Fig. 2 is an outer end view of the support, a portion thereof being broken away on the line 2—2 of Fig. 1.

Our improved support is adapted for use with any form of radiator, cooler or condenser used in an automobile or may, under certain circumstances, be used for supporting other parts carried by the frame. The frame may also be of any character desired, as our invention relates only to the connections between the frame and the cooler or the like.

The cooler or radiator 10 is provided with an outwardly-extending trunnion 11, which may, if desired, be hollow and which may be secured to the cooler in any suitable manner. As shown, the trunnion is carried by a side plate or base 12, rigidly secured to the side of the cooler. The trunnion 11 extends out over a portion of the frame 13 and is resiliently supported in respect to the latter. The outer surface of the trunnion is cylindrical and fits into a sleeve or bushing 14, so that the trunnion may rotate or oscillate within the bushing and may move longitudinally during the twisting or distorting of the frame. The bushing extends into a block 15 of resilient material, preferably rubber, and this block is supported and secured to the frame by a bearing box or casing 16. The bearing box or casing may be of any suitable form desired, provided with an opening in the face thereof toward the cooler, to facilitate the insertion of the resilient block 15 and the bushing or sleeve 14. These are held in place by a face plate 17 secured to the side of the casing and having a central aperture through which the trunnion may extend. The block of resilient material is illustrated as being annular in form and of substantially uniform thickness throughout its circumference, but it is evident that the cross sectional form of this block may be varied within wide limits without departing from the spirit of the invention. The weight of the cooler will come chiefly upon the portion of the block which is beneath the trunnion, and by making the block annular in form, it may be removed from the casing, rotated a portion of a revolution and replaced to bring a new portion into operative position when the block becomes worn or deteriorated. It is evident that the same would be true of any regular polygonal form.

The sleeve or bushing 14 is preferably slightly shorter than the chamber within which it is placed, so that its axis may be swung a limited extent out of the horizontal and in any desired direction. The sleeve may be held from longitudinal movement within the block by a circumferential bead 18, fitting into a groove in the block, but even if this bead be omitted, the trunnion would normally slip in the sleeve more easily than the sleeve would slip in the rubber block. The chamber receiving the block is bounded by the outer surface of the sleeve, the inner surface of the casing and the two ends of the casing. To permit of the compression or distortion of the rubber during the twisting of the trunnion, the outer and inner angles at the two ends of the block may be cut away to leave small annular spaces 19 into which the rubber may be compressed during the twisting of the sleeve.

By means of our improved construction, the radiator and the frame are so held in respect to each other that they cannot be accidentally separated, and none of the securing pieces can work loose or become lost. The loosening of the screws holding the plate 17, will not permit this plate to fall off as it is held by the trunnion, and neither the bushing nor the resilient block can get out of place. The trunnion may pull in and out to a slight extent to accommodate a certain distortion of the frame, and it may also rotate to a slight extent about its axis within the sleeve. The trunnion may also twist slightly to change its axis, either in a vertical or in a horizontal plane, or in any intermediate plane.

The specific form illustrated constitutes only one embodiment of our invention, and is to be considered in an illustrative rather than in a limited sense, inasmuch as various changes may be made within the scope of the appended claims and without departing from the spirit of the invention.

Having thus described our invention, we claim as new and desire to secure by Letters Patent:

1. In combination, an automobile frame, a bearing box carried thereby, a radiator presenting an outwardly-extending supporting member, and a resilient ring seated within said bearing box and encircling and supporting said supporting member.

2. In combination, an automobile frame, a bearing box carried thereby, a radiator presenting an outwardly-extending trunnion, and a block of resilient material seated within said bearing box and encircling and supporting said trunnion.

3. In combination, an automobile frame, a bearing box carried thereby, a radiator, and a trunnion secured thereto and extending into said box and resiliently supported therein.

4. In combination, an automobile frame, a bearing box carried thereby, a radiator, and a substantially horizontal supporting member extending outwardly from said radiator and entering said box, said member being longitudinally movable in respect to the box and resiliently supported therein.

5. In combination, an automobile frame, a block of resilient material carried thereby and having an opening therethrough, a radiator, and a supporting member secured to said radiator and supported within said opening and movable transversely of said frame.

6. In combination, an automobile frame, a radiator having a trunnion movable transversely of said frame, and a block of resilient material encircling and supporting said trunnion and secured to said frame.

7. In combination, an automobile frame, a block of resilient material carried thereby and having an opening therethrough, a bushing within said opening, and a radiator having a trunnion extending into said bushing.

8. In combination, an automobile frame, a block of resilient material carried thereby and having an opening therethrough, a bushing within said opening, and a radiator having a supporting member extending into said bushing and longitudinally movable in respect thereto.

9. In combination, an automobile frame, a block of resilient material carried thereby and having an opening therein, a bushing held against longitudinal movement within said opening, and a trunnion supported within said bushing and movable along its own axis and in respect to said frame.

10. Means for securing a radiator to an automobile frame, comprising a boxing or casing adapted to be secured to the frame, a block of resilient material carried by said casing, a bushing supported by said block, and an outwardly-extending member secured to said radiator and resting upon said bushing.

11. Means for securing a radiator to an automobile frame, comprising a bearing box having an opening therein, a block of resilient material seated within said bearing box, and a trunnion extending into said block of resilient material.

12. Means for securing a radiator to an automobile frame, comprising a bearing box having an opening therein, a block of resilient material disposed within said opening and presenting a curved surface, and a trunnion extending into said bearing box and supported from said curved surface, said trunnion being free to oscillate about its own axis and being free to move longitudinally in respect to the bearing box.

In testimony whereof we have signed our names to this specification in the presence of two subscribing witnesses.

D McRA LIVINGSTON.
CLAIR W. FAIRBANK.

Witnesses:
GEORGE H. EMSLIE,
JOHN P. DAVIS.